US009057337B2

(12) United States Patent
Sekiguchi et al.

(10) Patent No.: US 9,057,337 B2
(45) Date of Patent: Jun. 16, 2015

(54) AIR-FUEL RATIO CONTROL SYSTEM FOR INTERNAL COMBUSTION ENGINE

(75) Inventors: Tooru Sekiguchi, Wako (JP); Atsuhiro Miyauchi, Wako (JP); Takeshi Aoki, Wako (JP); Michinori Tani, Wako (JP); Takashi Yanagiura, Wako (JP); Seiji Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 534 days.

(21) Appl. No.: 13/527,408

(22) Filed: Jun. 19, 2012

(65) Prior Publication Data

US 2013/0047969 A1 Feb. 28, 2013

(30) Foreign Application Priority Data

Aug. 30, 2011 (JP) ................... 2011-186683
Aug. 30, 2011 (JP) ................... 2011-186684

(51) Int. Cl.
| G06F 19/00 | (2011.01) |
| G06G 7/70 | (2006.01) |
| F02D 41/14 | (2006.01) |
| F02D 41/22 | (2006.01) |
| F02D 41/28 | (2006.01) |

(52) U.S. Cl.
CPC ........ *F02D 41/1408* (2013.01); *F02D 41/1495* (2013.01); *F02D 41/22* (2013.01); *F02D 2041/288* (2013.01); *Y02T 10/40* (2013.01)

(58) Field of Classification Search
CPC . F02D 35/0015; F02D 41/14; F02D 41/1401; F02D 41/1408; F02D 41/1438; F02D 41/1495; F02D 41/222
See application file for complete search history.

(56) References Cited

U.S. PATENT DOCUMENTS

| 6,205,989 | B1 * | 3/2001 | Aoki ........................... 123/688 |
| 6,360,583 | B1 * | 3/2002 | Soltis et al. .................. 73/23.31 |
| 2005/0161032 | A1 * | 7/2005 | Nakagawa et al. ........... 123/673 |
| 2009/0100922 | A1 * | 4/2009 | Korbel et al. ............... 73/114.72 |

FOREIGN PATENT DOCUMENTS

| JP | 2010-133418 A | 6/2010 |
| JP | 2011-144754 A | 7/2011 |

* cited by examiner

*Primary Examiner* — Erick Solis
*Assistant Examiner* — Anthony L Bacon
(74) *Attorney, Agent, or Firm* — Mori & Ward, LLP

(57) ABSTRACT

An air-fuel ratio control system for an internal combustion engine has a perturbation control which oscillates the air-fuel ratio with a first frequency. A first difference signal is generated indicative of a difference between a present value and a first past value from an air-fuel ratio sensor detected at a timing of a first specific period which is set to reduce a specific frequency component corresponding to a specific frequency different from the first frequency. A first frequency component is extracted. A second difference signal is generated indicative of a difference between a present value and a second past value detected at a timing of a second specific period which is set to reduce the first frequency component. The specific frequency component is extracted. A failure of the control system is determined by a relationship between intensities of the first frequency component and the specific frequency component.

9 Claims, 9 Drawing Sheets

AIR-FUEL RATIO CONTROL SYSTEM FOR INTERNAL COMBUSTION ENGINE

BACKGROUND OF THE INVENTION

1. Field of the Invention

The present invention relates to an air-fuel ratio control system for an internal combustion engine and, particularly, to a control system which can determine a failure in the air-fuel ratio control system.

2. Description of the Related Art

Japanese Patent Laid-open Publication No. 2010-133418 (JP-'418) discloses an apparatus for determining a failure in an air-fuel ratio sensor disposed in the exhaust system of the engine. According to this apparatus, an air-fuel ratio perturbation control is performed during the engine operation for oscillating the air-fuel ratio with a predetermined frequency, and it is determined that the response characteristic deterioration failure has occurred in the air-fuel ratio sensor if an intensity of the predetermined frequency component contained in the output signal of the air-fuel ratio sensor during execution of the perturbation control, is equal to or less than a determination threshold value.

Japanese Patent Laid-open Publication No. 2011-144754 (JP-'754) discloses an air-fuel ratio control system which can determine an imbalance failure that air-fuel ratios corresponding a plurality of cylinders in the engine differ with each other more greatly than the allowable limit, based on the output signal of the air-fuel ratio sensor disposed in the exhaust system of the engine. According to this system, the air-fuel ratio perturbation control is performed during the engine operation for oscillating the air-fuel ratio with a predetermined frequency, and the imbalance failure is determined using a determination parameter which is obtained during the perturbation control. The determination parameter is calculated by dividing an intensity of the 0.5th-order frequency component contained in the output signal of the air-fuel ratio sensor by an intensity of the predetermined frequency component contained in the output signal of the air-fuel ratio sensor. The 0.5th-order frequency component is a component of a frequency which is half of the frequency corresponding to the engine rotational speed. When the imbalance failure occurs, the 0.5th-order frequency component intensity increases, and a value of the determination parameter increases as the degree of the imbalance failure increases. Accordingly, the imbalance failure can be determined by comparing the determination parameter with a predetermined threshold value.

In the apparatus of JP-'418, the predetermined frequency component is extracted using a band-pass filtering for calculating the intensity of the predetermined frequency component. The 0.5th-order frequency component increases when the imbalance in the air-fuel ratios corresponding to the plurality of cylinders exists, even if the imbalance degree is not so large that the imbalance failure is determined to occur. Therefore, if the predetermined frequency is in the vicinity of the 0.5th-order frequency, it is necessary to make the pass-band width WB of the band-bass filtering for extracting the predetermined frequency component narrower.

In the system of JP-'754, the 0.5th-order frequency component and the predetermined frequency component are extracted with the band-pass filtering for calculating the intensities of the 0.5th-order frequency component and the predetermined frequency component. In the imbalance failure determination, it is preferable to set the predetermined frequency in the vicinity of the 0.5th-order frequency, which requires a narrower pass-band width WB of the band-pass filtering.

FIGS. 11A and 11B show graphs for illustrating a relationship between the pass-band width WB and the transient response characteristic. The solid line L1, the broken line L2, and the dot-and-dash line L3 indicated in FIG. 11A correspond respectively to the solid line L11, the broken line L12, and the dot-and-dash line L13 indicated in FIG. 11B. Specifically, the rise time period, from the time t0 of starting the band-pass filtering to the time the filtered output VOUT reaches the steady output VST, becomes longer as the pass-band width WB becomes narrower. FIG. 12A shows an example of the rising characteristic of the filtered output signal. Further, when the input signal of the band-pass filtering (the air-fuel ratio sensor output signal) steeply changes, the initial oscillation as indicated in FIG. 12B may occur more easily as the pass-band width WB becomes narrower.

As described above, a narrow pass-band width WB of the band-pass filtering may cause some problems. Accordingly, it is desired to improve the S/N of the extracted signal, i.e., the ratio of the extracted signal intensity to the noise (unnecessary frequency components) intensity, using a band-pass filtering of a comparatively wide pass-band width WB.

SUMMARY OF THE INVENTION

The present invention was made contemplating the above described point, and an objective of the present invention is to provide an air-fuel ratio control system which can secure a sufficient S/N of the extracted signal using a band-pass filtering whose pass-band width is comparatively wide, to perform the failure determination of the air-fuel ratio control system in a comparatively short time period with high accuracy.

To attain the above objective, the present invention provides an air-fuel ratio control system for an internal combustion engine having a plurality of cylinders. The air-fuel ratio control system includes air-fuel ratio detecting means (15), air-fuel ratio oscillating means, first difference signal generating means, first extracting means, second difference signal generating means, second difference signal generating means, second extracting means, and failure determining means. The air-fuel ratio detecting means detects an air-fuel ratio in an exhaust passage of the engine. The air-fuel ratio oscillating means oscillates the air-fuel ratio with a first frequency (f1). The first difference signal generating means generates a first difference signal (DKACT1(k)) indicative of a difference between a present value (KACT(k)) and a first past value (KACT(k−NIMB), KACT(k−Nf2)) detected by the air-fuel ratio detecting means (15) during the operation of the air-fuel ratio oscillating means, wherein the first past value (KACT(k−NIMB), KACT(k−Nf2)) is a value detected at a timing of a first specific period (NIMB, Nf2) before and the first specific period (NIMB, Nf2) is set so as to reduce a specific frequency component (0.5th-order frequency component, f2-frequency component) corresponding to a specific frequency (fIMB, f2) which is different from the first frequency (f1). The first extracting means extracts a first frequency component corresponding to the first frequency (f1), contained in the first difference signal (DKACT1(k)). The second difference signal generating means generates a second difference signal (DKACT2(k)) indicative of a difference between a present value (KACT(k)) and a second past value (KACT(k−Nf1)) detected by the air-fuel ratio detecting means (15) during the operation of the air-fuel ratio oscillating means, wherein the second past value (KACT(k−Nf1)) is a value detected at a timing of a second specific period (Nf1)

before and the second specific period (Nf1) is set so as to reduce the first frequency component (f1-frequency component). The second extracting means extracts the specific frequency component (0.5th-order frequency component, f2-frequency component) contained in the second difference signal (DKACT2(k)). The failure determining means determines a failure of the air-fuel ratio control system based on a relationship between an intensity (MPTf1) of the first frequency component extracted by the first extracting means, and an intensity (MIMB, MPTf2) of the specific frequency component extracted by the second extracting means.

With this configuration, the air-fuel ratio perturbation control is performed to oscillate the air-fuel ratio with the first frequency, the first difference signal indicative of a difference between the present value and the first past value detected by the air-fuel ratio detecting means is generated during execution of the air-fuel ratio perturbation control, and the first frequency component contained in the first difference signal is extracted, wherein the first past value is a value detected at a timing of the first specific period before and the first specific period is set so as to reduce the specific frequency component corresponding to the specific frequency.

Further, the second difference signal indicative of a difference between the present value and the second past value detected by the air-fuel ratio detecting means is generated during execution of the air-fuel ratio perturbation control, and the specific frequency component contained in the second difference signal is extracted, wherein the second past value is a value detected at a timing of the second specific period before and the second specific period is set so as to reduce the first frequency component.

A failure of the air-fuel ratio control system is determined based on the relationship between the intensity of the first frequency component extracted by the first extracting means, and the intensity of the specific frequency component extracted by the second extracting means. The specific frequency component contained in the first difference signal is greatly reduced, and the first frequency component contained in the second difference signal is also greatly reduced. Accordingly, the first frequency component and the specific frequency component can be extracted with a sufficient S/N using a band-pass filtering whose pass-band width is comparatively wide. Consequently, the failure determination of the air-fuel ratio control system can be performed in a comparatively short time period with high accuracy.

In one aspect of the invention, the specific frequency component is a 0.5th-order frequency component which is a component of a frequency which is half of the frequency (fNE) corresponding to the engine rotational speed, and the failure determining means determines an imbalance failure based on the intensities (MPTf1, MIMB) of the first frequency component and the 0.5th-order frequency component, the imbalance failure being a failure that air-fuel ratios corresponding the plurality of cylinders of the engine differ with each other more greatly than an allowable limit.

With this configuration, the imbalance failure that the air-fuel ratios corresponding the plurality of cylinders of the engine differ with each other more greatly than the allowable limit, is determined based on the intensity of the 0.5th-order frequency component and the intensity of the first frequency component corresponding to the frequency of the air-fuel ratio perturbation control, the 0.5th-order frequency component being a component of the frequency corresponding to half of the engine rotational speed frequency. Accordingly, the intensities of the 0.5th-order frequency component and the first frequency component can accurately be calculated, which enables performing the imbalance failure determination with high accuracy.

In another aspect of the invention, the specific frequency component is a second frequency component corresponding to a frequency (f2) obtained by multiplying the first frequency (f1) and an integer ("2") greater than "1", and the failure determining means determines a response characteristic deterioration failure of the air-fuel ratio detecting means based on the intensities (MPTf1, MPTf2) of the first frequency component and the second frequency component.

With this configuration, the response characteristic deterioration failure of the air-fuel ratio detecting means is determined based on the intensity of the first frequency component and the intensity of the second frequency component corresponding to a frequency obtained by multiplying the first frequency and an integer greater than "1". The determination method of the response characteristic deterioration failure of the air-fuel ratio detecting means is shown in a publication of the Japanese patent application by the assignee of the present application (Honda Motor Co., Ltd.), for example in Japanese Patent Laid-open Publication No. 2010-101289 (JP-'289). According to this method, the response characteristic deterioration failure can be determined based on the intensity of the first frequency component, and a ratio of the first and second frequency components. Consequently, with the above-described configuration, the intensities of the first and second frequency components can accurately be calculated, which enables determining the response characteristic deterioration failure with high accuracy. The contents of Japanese Patent Laid-open Publication No. 2010-101289 are hereby incorporated by reference.

Preferably, the first frequency (f1) is set so as to increase as the engine rotational speed (NE) increases, and the second specific period (Nf1) is set so as to decrease as the first frequency (f1) increases.

With this configuration, the first frequency is set so as to increase as the engine rotational speed increases, and the second specific period is set so as to decrease as the first frequency increases. Accordingly, the air-fuel ratio perturbation control is performed with a frequency according to the engine operating condition, which enables suppressing deterioration of the exhaust characteristic when performing the failure determination. Further, by setting the second specific period so as to decrease as the first frequency increases, the first frequency component contained in the second difference signal can appropriately be reduced regardless of the engine rotational speed.

The present invention provides another air-fuel ratio control system for an internal combustion engine having a plurality of cylinders. The air-fuel ratio control system includes the air-fuel ratio detecting means (15), the air-fuel ratio oscillating means, first difference signal generating means, first second-order difference signal generating means, first extracting means, second difference signal generating means, second second-order difference signal generating means, second extracting means, third second-order difference signal generating means, third extracting means, first failure determining means, and second failure determining means. The first difference signal generating means generates a first difference signal (DKACT1(k)) indicative of a difference between a present value (KACT(k)) and a past value (KACT(k−NIMB)) detected by the air-fuel ratio detecting means (15) during the operation of the air-fuel ratio oscillating means, wherein the past value (KACT(k−NIMB)) is a value detected at a timing of a first specific period (NIMB) before and the first specific period (NIMB) is set so as to reduce a specific frequency component (0.5th-order frequency component) corresponding to a specific frequency (fIMB) which is different from the first frequency (f1). The first second-order difference signal generating means generates a first second-order difference signal (DDKACT1(k)) indicative of a difference between a present value (DKACT1(k)) and a past value (DKACT1(k−Nf2)) of the first difference signal, wherein the past value (DKACT1(k−Nf2)) is a value of the first difference signal at a timing of a second specific period (Nf2) before, and the second specific period (Nf2) is set so as to reduce a second frequency component corresponding to a frequency (f2) obtained by multiplying the first frequency (f1) and an integer ("2") greater than "1". The first extracting means extracts a first frequency component corresponding to the first frequency (f1), contained in the first second-order difference signal (DDKACT1(k)). The second difference signal generating means generates a second difference signal (DKACT2(k)) indicative of a difference between a present value (KACT(k)) and a past value (KACT(k−Nf1)) detected by the air-fuel ratio detecting means (15) during the operation of the air-fuel ratio oscillating means, wherein the past value (KACT(k−Nf1)) is a value detected at a timing of a third specific period (Nf1) before and the third specific period (Nf1) is set so as to reduce the first frequency component. The second second-order difference signal generating means generates a second second-order difference signal (DDKACT2(k)) indicative of a difference between a present value (DKACT2(k)) and a past value (DKACT2(k−Nf2)) of the second difference signal, Wherein the past value (DKACT2(k−Nf2)) is a value of the second difference signal at a timing of the second specific period (Nf2) before. The second extracting means extracts the specific frequency component (0.5th-order frequency component) contained in the second second-order difference signal (DDKACT2(k)). The third second-order difference signal generating means generates a third second-order difference signal (DDKACT3(k)) indicative of a difference between a present value (DKACT1(k)) and a past value (DKACT1(k−Nf1)) of the first difference signal, wherein the past value (DKACT1(k−Nf1)) is a value of the first difference signal at a timing of the third specific period (Nf1) before. The third extracting means extracts the second frequency component contained in the third second-order difference signal (DDKACT3(k)). The first failure determining means determines the response characteristic deterioration failure of the air-fuel ratio detecting means (15) based on a relationship between an intensity (MPTf1) of the first frequency component extracted by the first extracting means, and an intensity (MPTf2) of the second frequency component extracted by the third extracting means. The second failure determining means determines the imbalance failure based on a relationship between the intensity (MPTf1) of the first frequency component and an intensity (MIMB) of the specific frequency component extracted by the second extracting means.

With this configuration, the air-fuel ratio perturbation control is performed to oscillate the air-fuel ratio with the first frequency, and the first difference signal indicative of a difference between the present value and the past value detected at a timing of the first specific period before by the air-fuel ratio detecting means is generated during execution of the air-fuel ratio perturbation control, wherein the first specific period is set so as to reduce the specific frequency component corresponding to the specific frequency. Further, the first second-order difference signal indicative of a difference between the present value and the past value of the first difference signal is generated, and the first frequency component corresponding to the first frequency, contained in the first second-order difference signal is extracted, wherein the past value is a value of the first difference signal at a timing of the second specific period before, and the second specific period is set so as to reduce the second frequency component corresponding to the frequency obtained by multiplying the first frequency and an integer greater than "1".

The second difference signal indicative of a difference between the present value and the past value detected at a timing of the third specific period before by the air-fuel ratio detecting means is generated during execution of the air-fuel ratio perturbation control, wherein the third specific period is set so as to reduce the first frequency component. The second second-order difference signal indicative of a difference between the present value and the past value of the second difference signal is generated, and the specific frequency component contained in the second second-order difference signal is extracted, wherein the past value of the second difference signal is a value of the second specific period before. The third second-order difference signal indicative of a difference between the present value and the past value of the first difference signal is generated, and the second frequency component contained in the third second-order difference signal is extracted, wherein the past value of the first difference signal is a value of the third specific period before.

The response characteristic deterioration failure of the air-fuel ratio detecting means is determined based on the relationship between the intensity of the first frequency component extracted by the first extracting means, and the intensity of the second frequency component extracted by the third extracting means, while the imbalance failure of the air-fuel ratios is determined based on the relationship between the intensity of the first frequency component extracted by the first extracting means and the intensity of the specific frequency component extracted by the second extracting means.

The specific frequency component and the second frequency component contained in the first second-order difference signal are greatly reduced, the first and second frequency components contained in the second second-order difference signal are greatly reduced, and the specific frequency component and the first frequency component contained in the third second-order difference signal are greatly reduced. Accordingly, the first frequency component, the second frequency component, and the specific frequency component can be extracted with a sufficient S/N using a band-pass filtering whose pass-band width is comparatively wide. Consequently, the response characteristic deterioration failure determination of the air-fuel ratio detecting means, and the air-fuel ratio imbalance failure determination can be performed in a comparatively short time period with high accuracy.

Preferably, the first frequency (f1) is set so as to increase as the engine rotational speed (NE) increases, and the second and third specific periods (Nf2, Nf1) are set so as to decrease as the first frequency (f1) increases.

With this configuration, the first frequency is set so as to increase as the engine rotational speed increases, and the second and third specific periods are set so as to decrease as the first frequency increases. Accordingly, the air-fuel ratio perturbation control is performed with the frequency according to the engine operating condition, thereby suppressing deterioration of the exhaust characteristic of the engine when performing the failure determination. Further, by setting the second and third specific periods so as to decrease as the first frequency increases, the first frequency component contained in the second difference signal and the third second-order difference signal can appropriately be reduced regardless of the engine rotational speed, and the second frequency component contained in the first and second second-order difference signals can appropriately be reduced regardless of the engine rotational speed.

The present invention provides another air-fuel ratio control system for an internal combustion engine having a plurality of cylinders. The air-fuel ratio control system includes the air-fuel ratio detecting means (15), air-fuel-ratio oscillating means, difference signal generating means, extracting means, and failure determining means. The air-fuel-ratio oscillating means oscillates the air-fuel ratio with a set frequency (f1). The difference signal generating means generates a difference signal (DKACT(k)) indicative of a difference between a present value (KACT(k)) and a past value (KACT(k−NIMB)) detected by the air-fuel ratio detecting means (15), wherein the past value (KACT(k−NIMB)) is a value detected at a timing of a specific period (NIMB) before and the specific period (NIMB) is set so as to reduce a specific frequency component (0.5th-order frequency component) corresponding to a specific frequency (fIMB) which is different from the set frequency (f1). The extracting means extracts a set frequency component corresponding to the set frequency (f1), contained in the difference signal (DKACT(k)). The failure determining means determines the response characteristic deterioration failure of the air-fuel ratio detecting means based on a relationship between a failure determination threshold value (MPTf1TH) and an intensity (MPTf1) of the set frequency component extracted by the extracting means.

With this configuration, the air-fuel ratio perturbation control is performed to oscillate the air-fuel ratio with the set frequency, the difference signal indicative of a difference between the present value and the past value detected by the air-fuel ratio detecting means is generated during execution of the air-fuel ratio perturbation control, and the set frequency component contained in the difference signal is extracted, wherein the past value is a value detected at a timing of the specific period before and the specific period is set so as to reduce the specific frequency component corresponding to the specific frequency.

The response characteristic deterioration failure of the air-fuel ratio detecting means is determined based on the relationship between the intensity of the set frequency component extracted by the extracting means, and the failure determination threshold value. Since the specific frequency component contained in the difference signal is greatly reduced, the set frequency component can be extracted with a sufficient S/N using a band-pass filtering whose pass-band width is comparatively wide. Consequently, the determination of the response characteristic failure of the air-fuel ratio detecting means can be performed in a comparatively short time period with high accuracy.

Preferably, the failure determining means calculates the intensity (MPTf1) of the set frequency component by integrating an amplitude of the set frequency component extracted by the extracting means over a set integration period (TCAINT, TINT), and the set frequency (f1) is set so as to increase as the engine rotational speed (NE) increases and one of the following steps 1) to 3) is performed: 1) reducing the set integration period (TCAINT) as the engine rotational speed (NE) increases; 2) increasing the failure determination threshold value (MPTf1TH) as the engine rotational speed (NE) increases; and 3) correcting the intensity (MPTf1) of the set frequency component so as to decrease as the engine rotational speed (NE) increases.

With this configuration, the intensity of the set frequency component is calculated by integrating an amplitude of the set frequency component extracted by the extracting means over the set integration period, and the set frequency is set so as to increase as the engine rotational speed increases. Further, one of the above steps 1) to 3) is performed.

Performing the air-fuel ratio perturbation control with the frequency according to the engine operating condition, enables suppressing deterioration in the exhaust characteristic of the engine during execution of the failure determination, or reduction in the determination accuracy due to changes in the engine rotational speed. Specifically, by reducing the set integration period as the engine rotational speed increases, the execution time period of the air-fuel ratio perturbation control is shortened, which enables suppressing deterioration in the exhaust characteristic. Further, if the set integration period is a fixed time period, the intensity of the set frequency component calculated by the integrating calculation increases as the engine rotational speed increases. Accordingly, by increasing the failure determination threshold value as the engine rotational speed increases, or by correcting the intensity of the set frequency component so as to decrease as the engine rotational speed increases, reduction in the determination accuracy can be suppressed.

DETAILED DESCRIPTION OF THE PREFERRED EMBODIMENTS

Preferred embodiments of the present invention will now be described with reference to the drawings.

First Embodiment

Figure 1:
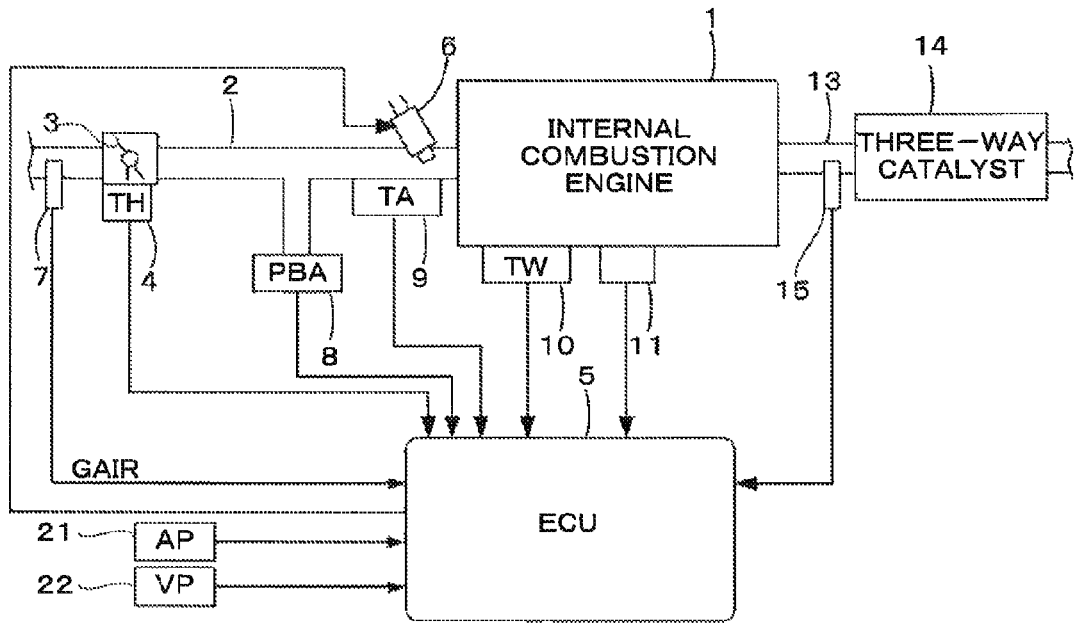
FIG. 1 shows a configuration of an internal combustion engine and an air-fuel ratio control system according to one embodiment of the present invention.

FIG. 1 is a schematic diagram showing a general configuration of an internal combustion engine (hereinafter referred to as "engine") and an air-fuel ratio control system therefor, according to one embodiment of the present invention. The engine is, for example, a four-cylinder engine 1 having an intake pipe 2 provided with a throttle valve 3. A throttle valve opening sensor 4 for detecting a throttle valve opening TH is connected to the throttle valve 3, and the detection signal is supplied to to an electronic control unit 5 (hereinafter referred to as "ECU").

Fuel injection valves 6 are inserted into the intake pipe 2 at locations intermediate between the cylinder block of the engine 1 and the throttle valve 3 and slightly upstream of the respective intake valves (not shown). These fuel injection valves 6 are connected to a fuel pump (not shown) and electrically connected to the ECU 5. A valve opening period of each fuel injection valve 6 is controlled by a signal output from the ECU 5.

An intake air flow rate sensor 7 for detecting an intake air flow rate GAIR is disposed upstream of the throttle valve 3. Further, an intake pressure sensor 8 for detecting an intake pressure PBA and an intake air temperature sensor 9 for detecting an intake air temperature TA are disposed downstream of the throttle valve 3. An engine coolant temperature sensor 10 for detecting an engine coolant temperature TW is mounted on the body of the engine 1. The detection signals of these sensors are supplied to the ECU 5.

A crank angle position sensor 11 for detecting a rotation angle of a crankshaft (not shown) of the engine 1 is connected to the ECU 5, and a signal corresponding to a detected rotation angle of the crankshaft is supplied to the ECU 5. The crank angle position sensor 11 includes a cylinder discrimination sensor which outputs a pulse (hereinafter referred to as "CYL pulse") at a predetermined crank angle position for a specific cylinder of the engine 1. The crank angle position sensor 11 also includes a top dead center (TDC) sensor which outputs a TDC pulse at a crank angle position before a TDC of a predetermined crank angle starting at an intake stroke in each cylinder (i.e., at every 180-degree crank angle in the case of a four cylinder engine) and a crank angle (CRK) sensor for generating one pulse (hereinafter referred to as "CRK pulse") with a CRK period (e.g., a period of 6 degrees, shorter than the period of generation of the TDC pulse). The CYL pulse, the TDC pulse and the CRK pulse are supplied to the ECU 5. The CYL, TDC and CRK pulses are used to control the various timings, such as a fuel injection timing and an ignition timing, and to detect an engine rotational speed NE.

The exhaust pipe 13 is provided with a three-way catalysts 14. The three-way catalyst 14 has oxygen storing capacity and stores oxygen contained in the exhaust gases in the exhaust lean condition where the air-fuel ratio of the air-fuel mixture supplied to the engine 1 is set to be lean with respect to the stoichiometric ratio, and the oxygen concentration in the exhaust gases is therefore relatively high. The three-way catalyst 14 oxidizes HC and CO contained in the exhaust gases with the stored oxygen in the exhaust rich condition where the air-fuel ratio of the air-fuel mixture supplied to the engine 1 is set to be rich with respect to the stoichiometric ratio, and the oxygen concentration in the exhaust gases is therefore low with a relatively large amount of HC and CO components.

A proportional type oxygen concentration sensor 15 (hereinafter referred to as "LAF sensor 15") is mounted on the upstream side of the three-way catalyst 14. The LAF sensor 15 outputs a detection signal substantially proportional to the oxygen concentration (air-fuel ratio) in the exhaust gases and supplies the detection signal to the ECU 5.

An accelerator sensor 21 and a vehicle speed sensor 22 are connected to the ECU 5. The accelerator sensor 21 detects an operation amount AP of the accelerator (not shown) of the vehicle driven by the engine 1 (hereinafter referred to as "the accelerator pedal operation amount AP"). The vehicle speed sensor 22 detects a running speed of the vehicle (vehicle speed) VP. The detection signals of the sensors 21 and 22 are supplied to the ECU 5. The throttle valve 3 is actuated by an actuator (not shown) to open and close, and the throttle valve opening TH is controlled by the ECU 5 according to the accelerator pedal operation amount AP.

It is to be noted that the engine 1 is provided with a well-known exhaust gas recirculation mechanism (not shown).

The ECU 5 includes an input circuit, a central processing unit (hereinafter referred to as "CPU"), a memory circuit, and an output circuit. The input circuit performs various functions, including shaping the waveforms of input signals from various sensors, correcting the voltage levels of the input signals to a predetermined level, and converting analog signal values into digital values. The memory circuit preliminarily stores various operating programs to be executed by the CPU and stores the results of computations, or the like, by the CPU. The output circuit supplies control signals to the fuel injection valves 6.

The CPU in the ECU 5 determines various engine operating conditions according to the detection signals of the various sensors described above and calculates a fuel injection period TOUT of each fuel injection valve 6 to be opened in synchronism with the TDC pulse for each cylinder, using the following equation (1) according to the above-determined engine operating conditions.

$$TOUT = TIM \times KCMD \times KAF \times KTOTAL \tag{1}$$

TIM is a basic fuel amount, specifically, a basic fuel injection, period of each fuel injection valve 6, which is determined by retrieving a TIM table set according to the intake flow rate GAIR. The TIM table is set so that the air-fuel ratio of the air-fuel mixture burning in the engine 1 becomes substantially equal to the stoichiometric ratio.

KCMD is a target air-fuel ratio coefficient set according to the operating condition of the engine 1. The target air-fuel ratio coefficient KCMD is proportional to the reciprocal of the air-fuel ratio A/F, i.e., proportional to a fuel-air ratio F/A, and takes a value of "1.0" for the stoichiometric ratio. Accordingly, the target air-fuel ratio coefficient KCMD is hereinafter referred to as "target equivalent ratio". When performing the imbalance failure determination of the air-fuel ratio described below, the target equivalent ratio KCMD is set so as to change in the sinusoidal wave form as the time lapses within the range of (1.0±DAF).

KAF is an air-fuel ratio correction coefficient calculated using a PID (proportional, integral, and differential) control method or an adaptive control method with a self-tuning regulator so that a detected equivalent ratio KACT calculated from a detected value of the LAF sensor 15 coincides with the target equivalent ratio KCMD when an execution condition of the air-fuel ratio feedback control is satisfied.

KTOTAL is a product of other correction coefficients (a correction coefficient KTW according to the engine coolant temperature, a correction coefficient KTA according to the intake air temperature, and the like).

The CPU in the ECU 5 supplies a drive signal for opening each fuel injection valve 6 according to the fuel injection period TOUT obtained as described above through the output circuit to the fuel injection valve 6. Further, the CPU in the ECU 5 performs the imbalance failure determination of the air-fuel ratio as described below.

The method for determining the imbalance failure in this embodiment is basically the same as the method shown in JP-'754 described above. Specifically, the air-fuel ratio perturbation control in which the air-fuel ratio is oscillated with an oscillation frequency f1 is performed during engine operation, and the imbalance failure is determined using a determination parameter RT which is obtained by dividing a 0.5th-order frequency component intensity MIMB by a f1-frequency component intensity MPf1, wherein both of the 0.5th-order frequency component and the f1-frequency component are contained in the output signal SLAF of the LAF sensor 15 during execution of the air-fuel ratio perturbation control.

Figure 2:
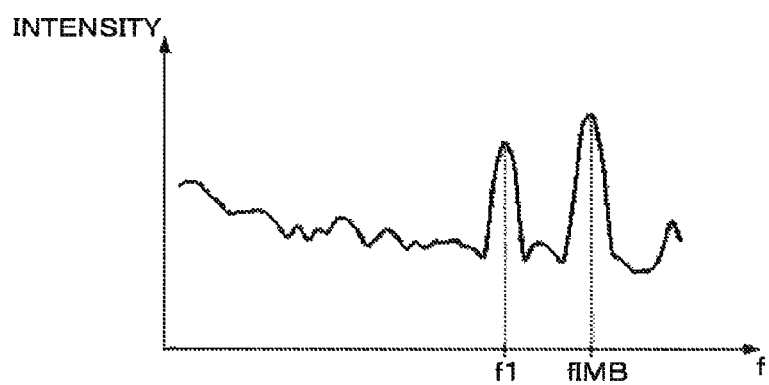
FIG. 2 shows a frequency spectrum for explaining the determination method of the imbalance failure.

FIG. 2 shows an example of the frequency spectrum of the LAF sensor output signal SLAF. In this example, the oscillation frequency f1 is set to a value obtained by multiplying "0.4" and the engine rotational speed frequency fNE (=NE/60) corresponding to the engine rotational speed NE [rpm] and the imbalance failure has occurred. As apparent from FIG. 2, the intensity MPTf1 of the f1-frequency component and the intensity MIMB of the fIMB-frequency component indicate peak values. The frequency fIMB is a frequency equal to half of the engine rotational speed frequency fNE (0.5×fNE), and the fIMB-frequency component corresponds to the 0.5th-order frequency component.

In this embodiment, for accurately calculating intensities of the components of two close frequencies, a difference DKACT(k) is calculated with the following equation (2) in which KACT(k) is a present value of the detected equivalent ratio KACT calculated from the LAF sensor output SLAF and KACT(k−NP) is a past value obtained a predetermined period TP before. The imbalance failure is determined using the difference DKACT(k), "NP" in the equation (2) is a discrete delay time period obtained by digitizing a predetermined time period TP with the sampling period TPSP of the LAF sensor output SLAF.

$$DKACT(k)=KACT(k)-KACT(k-NP) \quad (2)$$

Figure 3:
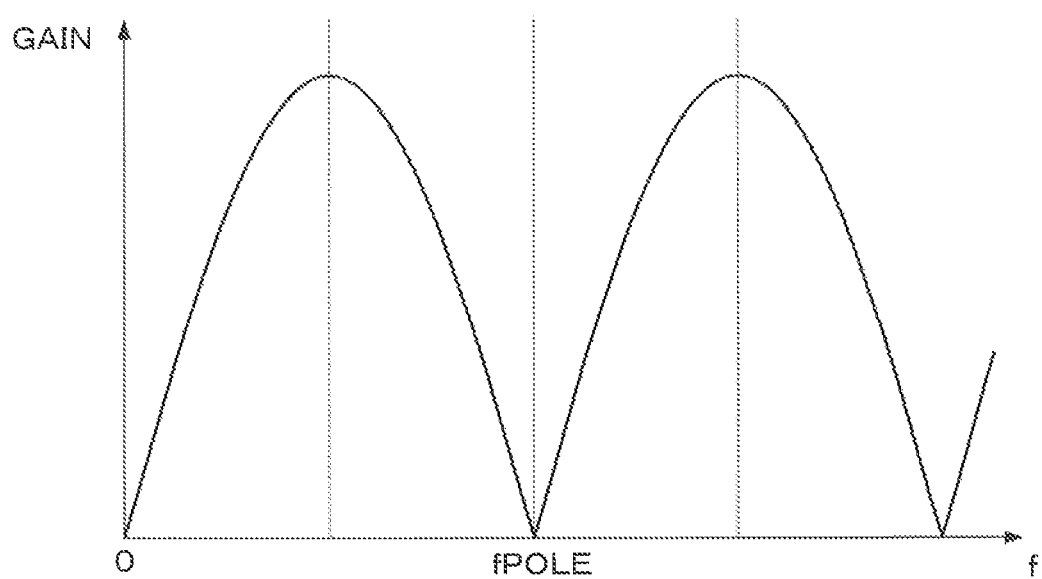
FIG. 3 shows a frequency characteristic of the difference calculation process for reducing a specific frequency component.

The gain frequency characteristic of the difference DKACT(k) calculated by the equation (2) is generally indicated as shown in FIG. 3. The attenuation pole frequency fPOLE shown in FIG. 3 is a frequency corresponding to a reciprocal of the predetermined time period TP as shown in the following equation (3).

$$fPOLE=1/TP \quad (3)$$

In this embodiment, when extracting the 0.5th-order frequency component, the detected equivalent ratio KACT is sampled at intervals of "30" degree crank angle and the discrete delay time period NP of the equation (2) is set to "30" so that the attenuation pole frequency fPOLE is made equal to the oscillation frequency f1 (=0.4 fNE) of the air-fuel ratio. Further, when extracting the f1-frequency component, the discrete delay time period NP of the equation (2) is set to "24" so that the attenuation pole frequency fPOLE is made equal to the 0.5th-order frequency fIMB. Using the sampling period TPST depending on the attenuation pole frequency and the corresponding discrete delay time period NP makes it possible to improve the S/N of the extracted signal.

The band-pass filtering of the difference DKACT(k) is performed to extract the required frequency component, and the 0.5th-order frequency component intensity MIMB and the f1-frequency component intensity MPTf1 are calculated using the extracted frequency component. By setting the pass-band width WB of the band-pass filtering to a comparatively wide range, the imbalance failure determination can be performed in a comparatively short time period with high accuracy.

Figure 4:
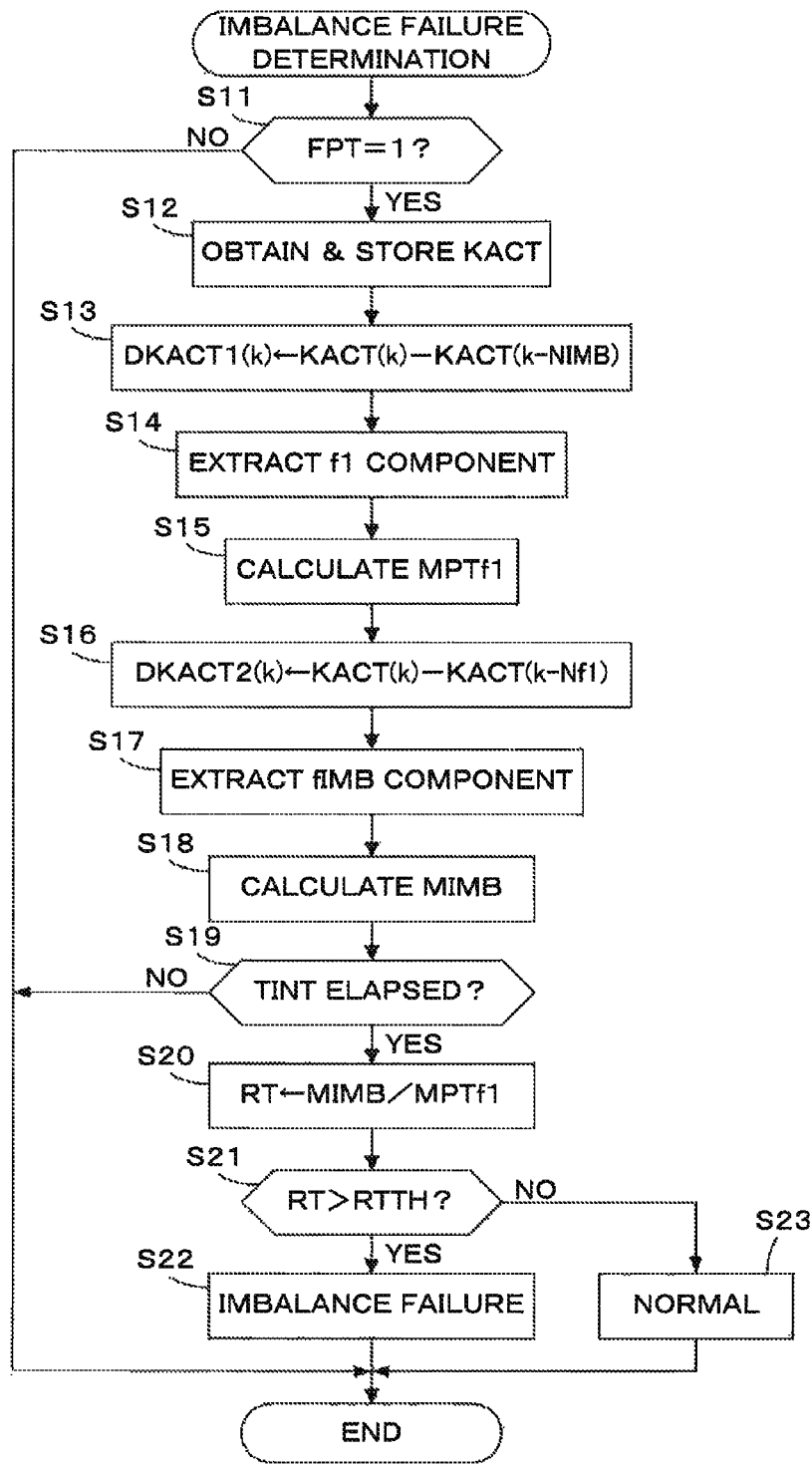
FIG. 4 is a flowchart of a process for performing a determination of the imbalance failure.

FIG. 4 is a flowchart of the imbalance failure determination process in this embodiment. This process is executed by the CPU in the ECU 5 at intervals of a predetermined crank angle CACAL (for example, 30 degrees), when the execution condition of the imbalance failure determination is satisfied.

The execution condition of the imbalance failure determination is satisfied if all of the following conditions 1)-11) are fulfilled:
1) The engine rotational speed NE is within the range defined by a predetermined upper limit value and a predetermined lower limit value;
2) The intake pressure PBA is higher than a predetermined pressure (the exhaust gas flow rate required for the determination is secured);
3) The LAF sensor 15 is activated;
4) The air-fuel ratio feedback control according to the output of the LAF sensor 15 is being performed;
5) The engine coolant temperature TW is higher than a predetermined temperature;
6) The change amount DNE in the engine rotational speed NE per unit time period is less than a predetermined rotational speed change amount;
7) The change amount DPBAF in the intake pressure PBA per unit time period is less than a predetermined intake pressure change amount.
8) The acceleration increase in the fuel amount (which is performed at a rapid acceleration) is not performed;
9) The exhaust gas recirculation ratio is greater than a predetermined value;
10) The LAF sensor output is not in the state of being held at the upper limit value or the lower limit value; and
11) The response characteristic of the LAF sensor is normal (the deterioration failure in the response characteristic of the LAF sensor is not determined to have occurred).

The air-fuel ratio perturbation control in which the target equivalent ratio KCMD is oscillated using the following equation (4), is started, if the imbalance failure determination execution condition is satisfied. When performing the air-fuel ratio perturbation control, the air-fuel ratio correction coefficient KAF is fixed at "1.0" or a specific value other than "1.0". In the equation (4), Kf1 is a first frequency coefficient which is set to "0.4" when setting the oscillation frequency f1 to a frequency of "0.4 fNE", and "k" is a discrete time digitized with the calculation period CACAL of the target equivalent ratio KCMD.

$$KCMD=DAF\times\sin(Kf1\times CACAL\times k)+1 \quad (4)$$

In step S11 of FIG. 4, it is determined whether or not the air-fuel ratio perturbation control flag FPT is "1". The air-fuel ratio perturbation control flag FPT is set to "1", when a predetermined stabilization time period TSTBL has elapsed from the time of starting the air-fuel ratio perturbation control. If the answer to step S11 is negative (NO), the process immediately ends.

If the answer to step S11 is affirmative (YES), the present value KACT(k) of the detected equivalent ratio KACT is obtained, and the obtained value KACT(k) is stored in the memory (step S12). The memory stores past values of the detected equivalent ratio KACT, wherein the number of the stored past values is set to a number required for calculating the difference DKACT with the above-described equation (2).

In step S13, a first difference DKACT1(k) is calculated by the following equation (5). In the equation (5), NIMB is a first discrete delay time period for attenuating the 0.5th-order frequency component, and is set to "24" in this embodiment.

$$DKACT1(k)=KACT(k)-KACT(k-NIMB) \quad (5)$$

In step S14, the band-pass filtering of the first difference DKACT1(k) is performed to extract the f1-frequency component. In step S15, the f1-frequency component intensity MPTf1 is calculated by integrating the absolute value (amplitude) of the band-pass filtering output obtained in step S14.

In step S16, a second difference DKACT2(k) is calculated by the following equation (6). In the equation (6), Nf1 is a second discrete delay time period for attenuating the f1-frequency component, and is set to "30" in this embodiment.

$$DKACT2(k)=KACT(k)-KACT(k-Nf1) \quad (6)$$

In step S17, the band-pass filtering of the second difference DKACT2(k) is performed to extract the 0.5th-order frequency component. In step S18, the 0.5th-order frequency component intensity MIMB is calculated by integrating the absolute value (amplitude) of the band-pass filtering output obtained in step S17.

In step S19, it is determined whether or not a predetermined integration time period TINT has elapsed from the time of starting calculation of the frequency component intensities. If the answer to step S19 is negative (NO), the process immediately ends. If the answer to step S19 is affirmative (YES), a determination parameter RT is calculated by the following equation (7).

$$RT=MIMB/MPTf1 \quad (7)$$

In step S21, it is determined whether or not the determination parameter RT is greater than a determination threshold value RTTH. If the answer to step S21 is affirmative (YES), it is determined that the imbalance failure has occurred (step S22). On the other hand, if the answer to step S21 is negative (NO), it is determined that differences in the air-fuel ratios corresponding to the four cylinders are within the acceptable range, i.e., the control system is determined to be normal (step S23).

As described above, in this embodiment, the air-fuel ratio perturbation control is performed to oscillate the air-fuel ratio with the frequency f1, and the first difference DKACT1(k) indicative of a difference between the present detected value KACT(k) and the past value KACT(k–NIMB) is calculated during execution of the air-fuel ratio perturbation control, wherein the past value KACT(k–NIMB) is a value detected at a timing of the first discrete delay time period NIMB before and the first discrete delay time period NIMB is set so as to reduce the 0.5th-order frequency component corresponding to the 0.5th-order frequency fIMB. Further, the f1-frequency component contained in the first difference DACT1(k) is extracted by the band-pass filtering, and the f1-frequency component intensity MPTf1 is calculated by integrating the absolute value of the band-pass filtering output.

Further, the second difference DKACT2(k) indicative of a difference between the present value KACT(k) and the past value KACT(k–Nf1) is calculated during execution of the air-fuel ratio perturbation control, wherein the past value KACT(k–Nf1) is a value detected at a timing of the second discrete delay time period Nf1 before and the second discrete delay time period Nf1 is set so as to reduce the f1-frequency component. Further, the 0.5th-order frequency component contained in the second difference DACT2(k) is extracted by the band-pass filtering, and the 0.5th-order frequency component intensity MIMB is calculated by integrating the absolute value of the band-pass filtering output.

The imbalance failure is determined by comparing the determination parameter RT calculated by dividing the 0.5th-order frequency component intensity MIMB by the f1-frequency component intensity MPTf1, with the determination threshold value RTTH. The 0.5th-order frequency component contained in the first difference DKACT1(k) is greatly reduced, and the f1-frequency component contained in the second difference DKACT2(k) is also greatly reduced. Accordingly, the f1-frequency component and the 0.5th-order frequency component can be extracted with a sufficient S/N using a band-pass filtering whose pass-band width is comparatively wide. Consequently, the imbalance failure determination can be performed in a comparatively short time period with high accuracy.

Further in this embodiment, the frequency f1 with which the air-fuel ratio perturbation is performed is set to a frequency obtained by multiplying the engine rotational speed frequency fNE and "0.4", i.e., the frequency f1 increases as the engine rotational speed increases. This setting of the frequency f1 enables suppressing reduction in determination accuracy and deterioration in the exhaust characteristic when performing the failure determination. If the oscillation frequency of the air-fuel ratio is set to a fixed value, the oscillation frequency may have a specific relationship with the engine rotational speed NE (e.g., the oscillation frequency may become equal to the engine rotational frequency fNE or half of the engine rotational frequency fNE), which makes it impossible to distinguish the air-fuel ratio change due to the air-fuel perturbation control from the air-fuel ratio change caused by the noises due to the engine rotation. In this embodiment, such problem can be avoided since the frequency f1 is set to the frequency of (0.4×fNE). If, for example, a period of "20" oscillation cycles is required for completing the failure determination, the time period for the failure determination can be shortened as the engine rotational speed NE increases, which enables suppressing deterioration in the exhaust gas characteristic of the engine caused by performing the air-fuel ratio perturbation control.

In this embodiment, the LAF sensor 15 corresponds to the air-fuel ratio detecting means, the fuel injection valve 6 corresponds to a part of the air-fuel ratio oscillating means, the ECU 5 constitutes a part of the air-fuel ratio oscillating means, the first difference signal generating means, the first extracting means, the second difference signal generating means, the second extracting means, and the failure determining means. Specifically, step S13 of FIG. 4 corresponds to the first difference signal generating means, step S14 corresponds to the first extracting means, step S16 corresponds to the second difference signal generating means, step S17 corresponds to the second extracting means, and steps S15, S18, and S20-S23 correspond to the failure determining means.

Second Embodiment

In this embodiment, the present invention is applied to determining the response characteristic deterioration failure of the LAF sensor 15. This embodiment is identical to the first embodiment except for the points described below.

The determination method of the response characteristic deterioration failure is basically the same as the method disclosed in JP-'289 described above. This embodiment is characterized by the method of extracting the frequency components required for the determination. Specifically, in this embodiment, the air-fuel ratio perturbation control is performed for oscillating the air-fuel ratio with the frequency f1 (hereinafter referred to as "first frequency f1"), and the response characteristic deterioration failure is determined using the intensity MPTf1 of the f1-frequency component and an intensity MPTf2 of an f2-frequency component which are contained in the detected equivalent ratio KACT calculated from the output signal of the LAF sensor 15. The f2-frequency component is a component of a frequency f2 (hereinafter referred to as "second frequency f2") which is equal to twice the frequency f1 (2×f1).

Figure 5:
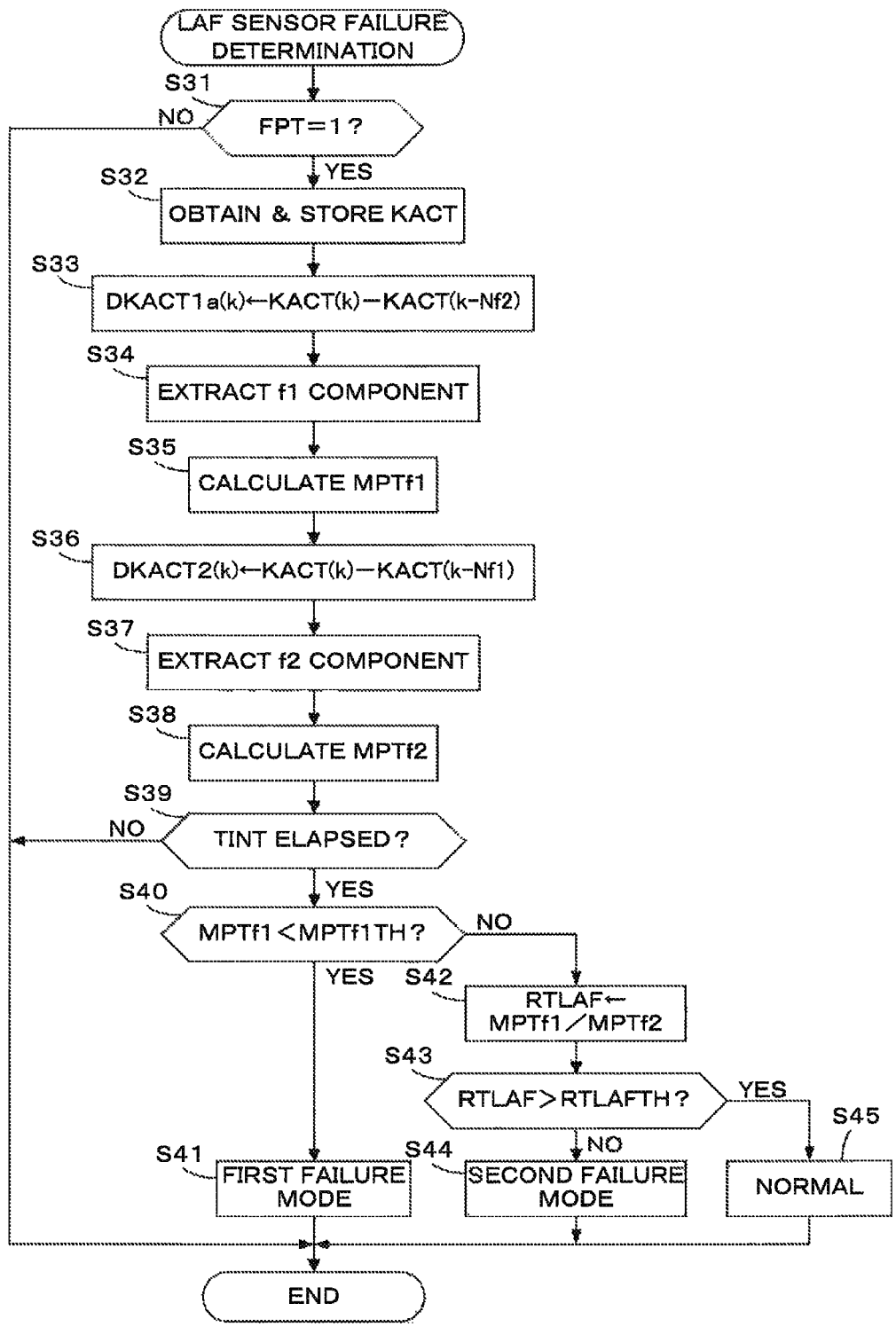
FIG. 5 is a flowchart of a process for performing a determination of the response characteristic deterioration failure of an oxygen concentration sensor (air-fuel ratio sensor) (the second embodiment)

FIG. 5 is a flowchart of the LAF sensor failure determination process in this embodiment. This process is executed by the CPU in the ECU 5 at intervals of a predetermined crank angle CACAL (for example, 30 degrees), when the execution condition of the LAF sensor failure determination is satisfied.

The execution condition of the LAF sensor failure determination is the same as that of the imbalance failure determination in the first embodiment.

In step S31 of FIG. 5, it is determined whether or not the air-fuel ratio perturbation control flag FPT is "1". If the answer to step S31 is negative (NO), the process immediately ends. If the answer to step S31 is affirmative (YES), the present value KACT(k) of the detected equivalent ratio KACT is obtained, and the obtained value KACT(k) is stored in the memory (step S32).

In step S33, a first difference DKACT1a(k) is calculated by the following equation (11). In the equation (11), Nf2 is a third discrete delay time period for attenuating the f2-frequency component, and is set to "15" in this embodiment.

$$DKACT1a(k)=KACT(k)-KACT(k-Nf2) \quad (11)$$

In step S34, the band-pass filtering of the first difference DKACT1a(k) is performed to extract the f1-frequency component. In step S35, the f1-frequency component intensity MPTf1 is calculated by integrating the absolute value (amplitude) of the band-pass filtering output obtained in step S34.

In step S36, the second difference DKACT2(k) is calculated by the above-described equation (6). In step S37, the band-pass filtering of the second difference DKACT2(k) is performed to extract the f2-frequency component. In step S38, the f2-frequency component intensity MPTf2 is calculated by integrating the absolute value (amplitude) of the band-pass filtering output obtained in step S37.

In step S39, it is determined whether or not the predetermined integration time period TINT has elapsed from the time of starting calculation of the frequency component intensities. If the answer to step S39 is negative (NO), the process immediately ends. If the answer to step S19 is affirmative (YES), the process proceeds to step S40, in which it is determined whether or not the f1-frequency component intensity MPTf1 is less than an intensity determination threshold value MPTf1TH.

If the answer to step S40 is affirmative (YES), it is determined that a failure of a first failure mode has occurred (step S41). The failure of the first failure mode is a failure where both of the response characteristics on the rich side and the lean side of the LAF sensor output similarly deteriorate. If the answer to step S40 is negative (NO), the f1-frequency component intensity MPTf1 and the f2-frequency component intensity MPTf2 are applied to the following equation (12) to calculate a determination parameter RTLAF (step S42).

$$RTLAF=MPTf1/MPTf2 \quad (12)$$

In step S43, it is determined whether or not the determination parameter RTLAF is greater than a determination threshold value RTLAFTH. If the answer to step S43 is negative (NO), it is determined that a failure of a second failure mode has occurred (step S44). The failure of the second failure mode is a failure where the response characteristics on the rich side and the lean side of the LAF sensor output unsymmetrically deteriorate. If the answer to step S43 is affirmative (YES), the LAF sensor 15 is determined to be normal (the response characteristic deterioration failure has not occurred) (step S45).

As described above, in this embodiment, the air-fuel ratio perturbation control is performed to oscillate the air-fuel ratio with the frequency f1, and the first difference DKACT1a(k) indicative of a difference between the present detected value KACT(k) and the past value KACT(k-Nf2) is calculated during execution of the air-fuel ratio perturbation control, wherein the past value KACT(k-Nf2) is a value detected at a timing of the third discrete delay time period Nf2 before and the third discrete delay time period Nf2 is set so as to reduce the f2-frequency component corresponding to the second frequency f2. The f1-frequency component contained in the first difference DACT1a(k) is extracted by the band-pass filtering, and the f1-frequency component intensity MPTf1 is calculated by integrating the absolute value of the band-pass filtering output.

Further, the second difference DKACT2(k) indicative of a difference between the present value KACT(k) and the past value KACT(k-Nf1) is calculated during execution of the air-fuel ratio perturbation control, wherein the past value KACT(k-Nf1) is a value detected at a timing of the second discrete delay time period Nf1 before and the second discrete delay time period Nf1 is set so as to reduce the f1-frequency component. Further, the f2-frequency component contained in the second difference DACT2(k) is extracted by the band-pass filtering, and the f2-frequency component intensity MPTf2 is calculated by integrating the absolute value of the band-pass filtering output.

The response characteristic deterioration of the LAF sensor 15 is determined using the f1-frequency component intensity MPTf1 and the f2-frequency component intensity MPTf2. The f2-frequency component contained in the first difference DKACT1a(k) is greatly reduced, and the f1-frequency component contained in the second difference DKACT2(k) is also greatly reduced. Accordingly, the f1-frequency component and the f2-frequency component can be extracted with a sufficient S/N using a band-pass filtering whose pass-band width is comparatively wide. Consequently, the response characteristic deterioration failure determination can be performed in a comparatively short time period with high accuracy.

In this embodiment, step S33 of FIG. 5 corresponds to the first difference signal generating means, step S34 corresponds to the first extracting means, step S36 corresponds to the second difference signal generating means, step S37 corresponds to the second extracting means, and steps S35, S38, and S40-S45 correspond to the failure determining means.

Third Embodiment

In this embodiment, both of the imbalance failure determination and the response characteristic deterioration failure determination of the LAF sensor are performed, wherein the difference calculation is performed for attenuating two unnecessary frequency components before the band-pass filtering for extracting the frequency components required for the determinations. This embodiment is identical to the first and second embodiments except for the points described below.

Figure 6:
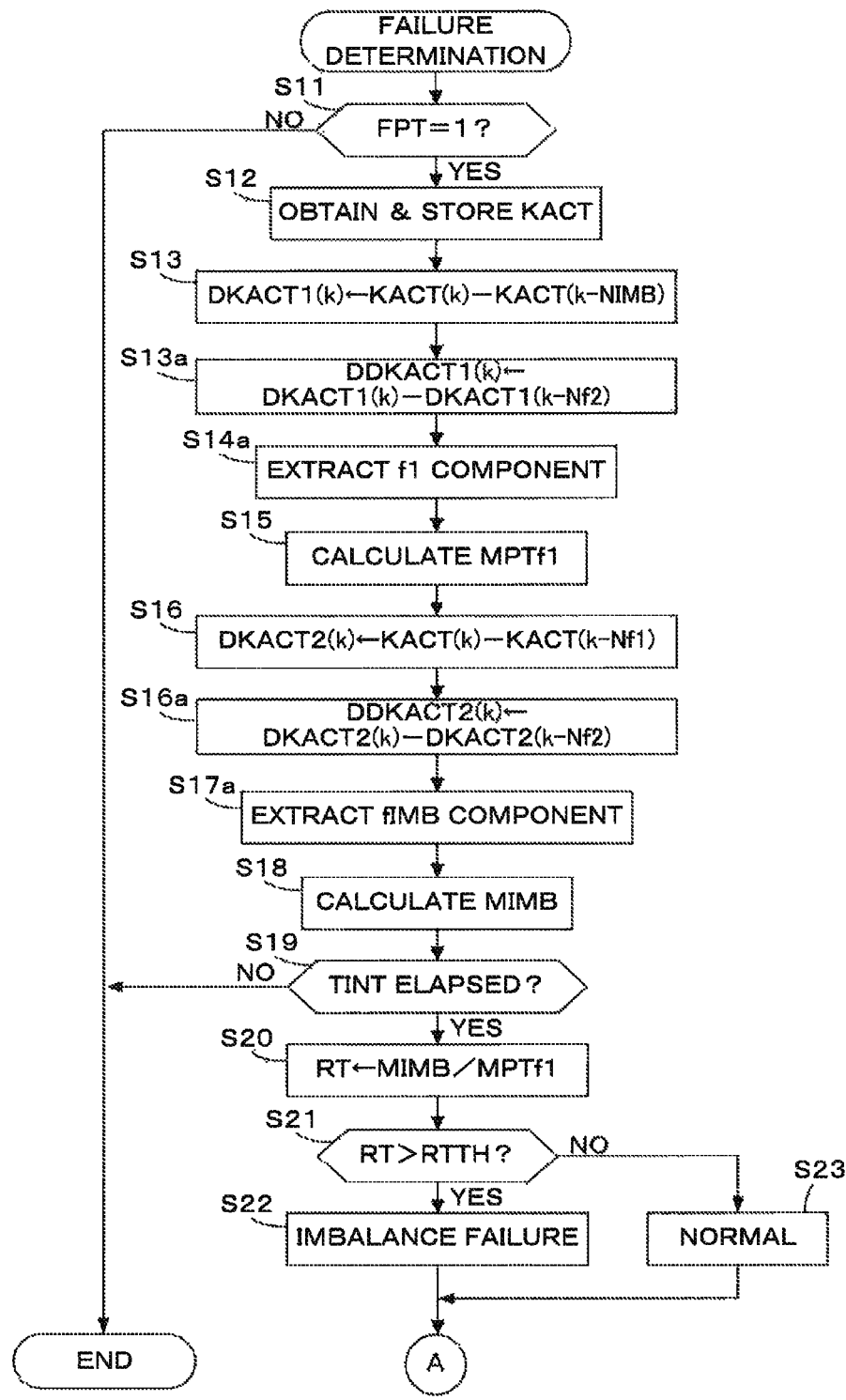
FIGS. 6 and 7 show a flowchart of a process for performing determinations of the imbalance failure and the response characteristic deterioration failure (the third embodiment)
Figure 7:
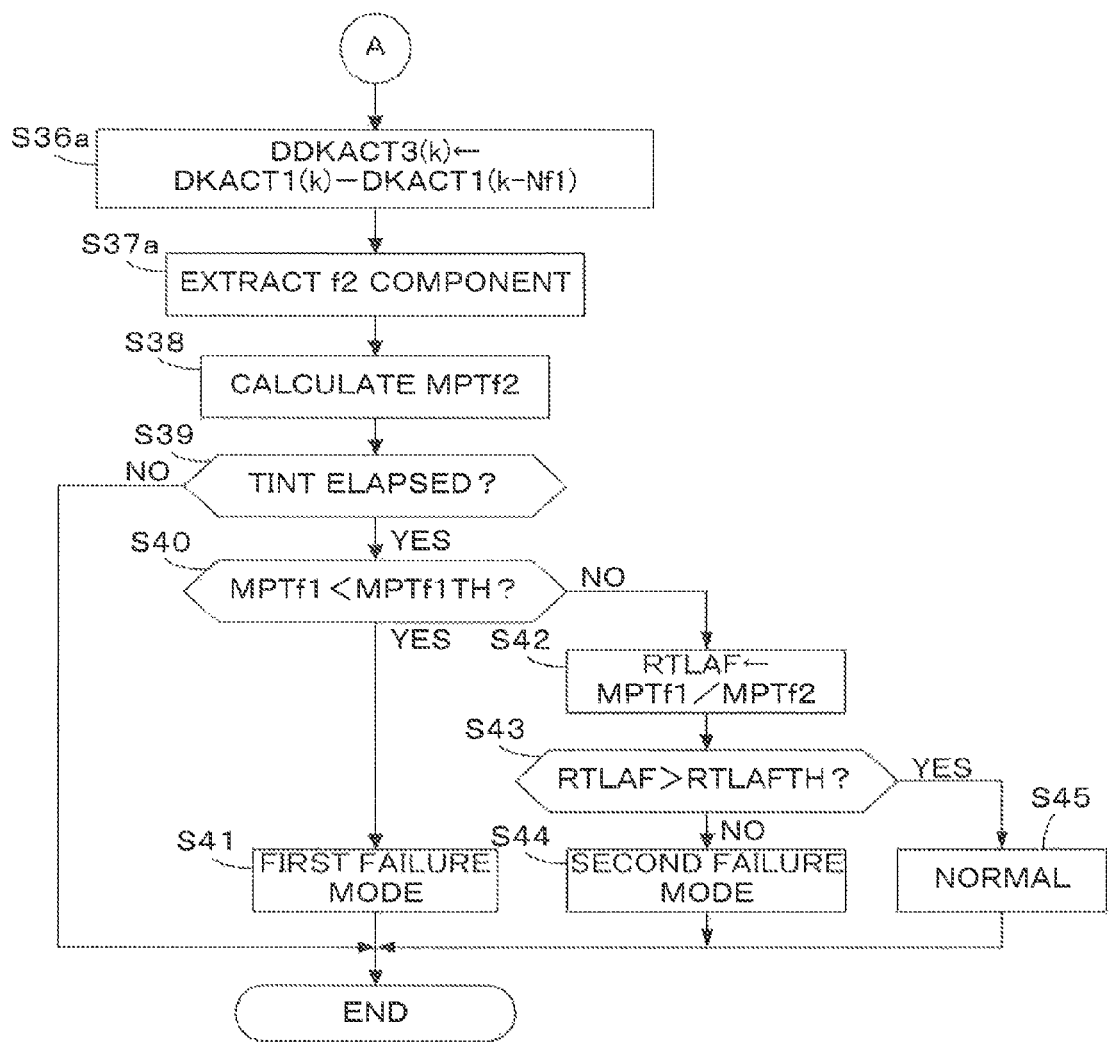

FIGS. 6 and 7 show a flowchart of a process for determining the imbalance failure and the response characteristic deterioration failure of the LAF sensor. The portion shown in FIG. 6 is obtained by adding steps S13a and S16a to the process of FIG. 4 and replacing steps S14 and S17 with steps S14a and S17a, respectively. The portion shown in FIG. 6 continues to the portion shown in FIG. 7. The portion shown in FIG. 7 is obtained by deleting steps S31-S35 of FIG. 5 and replacing steps S36 and S37 with step S36a and S37a, respectively.

In step S13a of FIG. 6, the present value DKACT1(k) and the past value DKACT1(k-Nf2) calculated the third discrete delay time period Nf2 before of the first difference DKACT1 are applied to the following equation (21) to calculate a first second-order difference DDKACT1(k).

$$DDKACT1(k)=DKACT1(k)-DKACT1(k-Nf2) \quad (21)$$

In step S14a, the band-pass filtering of the first second-order difference DDKACT1(k) is performed for extracting the f1-frequency component, and the f1-frequency component intensity MPTf1 is calculated by integrating the absolute value (amplitude) of the band-pass filtering output obtained in step S14a (step S15).

In step S16a, the present value DKACT2(k) and the past value DKACT2(k−Nf2) calculated the third discrete delay time period Nf2 before of the second difference DKACT2 are applied to the following equation (22) to calculate a second second-order difference DDKACT2(k).

$$DDKACT2(k)=DKACT2(k)-DKACT2(k-Nf2) \quad (22)$$

In step S17a, the band-pass filtering of the second second-order difference DDKACT2(k) is performed for extracting the 0.5th-order frequency component, and the 0.5th-order frequency component intensity MIMB is calculated by integrating the absolute value (amplitude) of the band-pass filtering output obtained in step S17a (step S18).

In step S36a of FIG. 7, the present value DKACT1(k) and the past value DKACT1(k−Nf1) calculated the second discrete delay time period Nf1 before of the first difference DKACT1 are applied to the following equation (23) to calculate a third second-order difference DDKACT3(k).

$$DDKACT3(k)=DKACT1(k)-DKACT1(k-Nf1) \quad (23)$$

In step S37a, the band-pass filtering of the third second-order difference DDKACT3(k) is performed for extracting the f2-frequency component, and the f2-frequency component intensity MPTf2 is calculated by integrating the absolute value (amplitude) of the band-pass filtering output obtained in step S37a (step S38).

According to this embodiment, the air-fuel ratio perturbation control is performed to oscillate the air-fuel ratio with the frequency f1, and the first difference DKACT1(k) indicative of a difference between the present value KACT(k) and the past value KACT(k−NIMB) of the detected equivalent ratio KACT is calculated during execution of the air-fuel ratio perturbation control, wherein the past value KACT(k−NIMB) is a value detected at a timing of the first discrete delay time period NIMB before and the first discrete delay time period NIMB is set so as to reduce the 0.5th-order frequency component corresponding to the 0.5th-order frequency fIMB. Further, the first second-order difference DDACT1(k) indicative of a difference between the present value DKACT1(K) and the past value DKACT1(k−Nf2) of the first difference DKACT1 is calculated, wherein the past value DKACT1(k−Nf2) is a value at a timing of the third discrete time period Nf2 before, and the third discrete time period Nf2 is set so as to reduce the frequency component corresponding to the second frequency f2. The f1-frequency component contained in the first second-order difference DDACT1(k) is extracted by the band-pass filtering.

Further, the second difference DKACT2(k) indicative of a difference between the present value KACT(k) and the past value KACT(k−Nf1) of the detected equivalent ratio KACT is calculated during execution of the air-fuel ratio perturbation control, wherein the past value KACT(k−Nf1) is a value detected at a timing of the second discrete delay time period Nf1 before and the second discrete delay time period Nf1 is set so as to reduce the f1-frequency component. The second second-order difference DKACT2(k) indicative of a difference between the present value DKACT2(k) and the past value DKACT2(k−Nf2) of the second difference DACT2 is calculated, wherein the past value DKACT2(k−Nf2) is a value at a timing of the third discrete delay time period Nf2 before. The 0.5th-order frequency component contained in the second second-order difference DDACT2(k) is extracted by the band-pass filtering.

Further, the third second-order difference DDKACT3(k) indicative of a difference between the present value DKACT1(k) and the past value DKACT1(k−Nf2) of the first difference DKACT1 is calculated, wherein the past value DKACT1(k−Nf2) is a value at a timing of the third discrete delay time period Nf2 before. The f2-frequency component contained in the third second-order difference DDACT3(k) is extracted by the band-pass filtering.

The response characteristic deterioration failure of the LAF sensor 15 is determined based on the relationship between the f1-frequency component intensity MPTf1 and the f2-frequency component intensity MPTf2, while the imbalance failure of the air-fuel ratios in the plurality of cylinders is determined based on the relationship between the f1-frequency component intensity MPTf1 and the 0.5th-order frequency component intensity MIMB.

The 0.5th-order frequency component and the f2-frequency component contained in the first second-order difference DDKACT1(k) are greatly reduced, the f1-frequency component and the f2-frequency component contained in the second second-order difference DDKACT2(k) are greatly reduced, and the 0.5th-order frequency component and the f1-frequency component contained in the third second-order difference DDKACT3(k) are greatly reduced. Accordingly, the f1-frequency component, the f2-frequency component, and the 0.5th-order frequency component can be extracted with a sufficient S/N using a band-pass filtering whose passband width is comparatively wide. Consequently, the response characteristic deterioration failure determination of the LAF sensor 15, and the air-fuel ratio imbalance failure determination can be performed in a comparatively short time period with high accuracy.

In this embodiment, step S13a corresponds to the first second-order difference signal generating means, step S14a corresponds to the first extracting means, step S16a corresponds to the second second-order difference signal generating means, step S17a corresponds to the second extracting means, step S36a corresponds to the third second-order difference signal generating means, step S37a corresponds to the third extracting means, steps S15, S18, and S20-S23 correspond to the second failure determining means, and steps S15, S38, and S40-S45 correspond to the first failure determining means.

Fourth Embodiment

Figure 8:
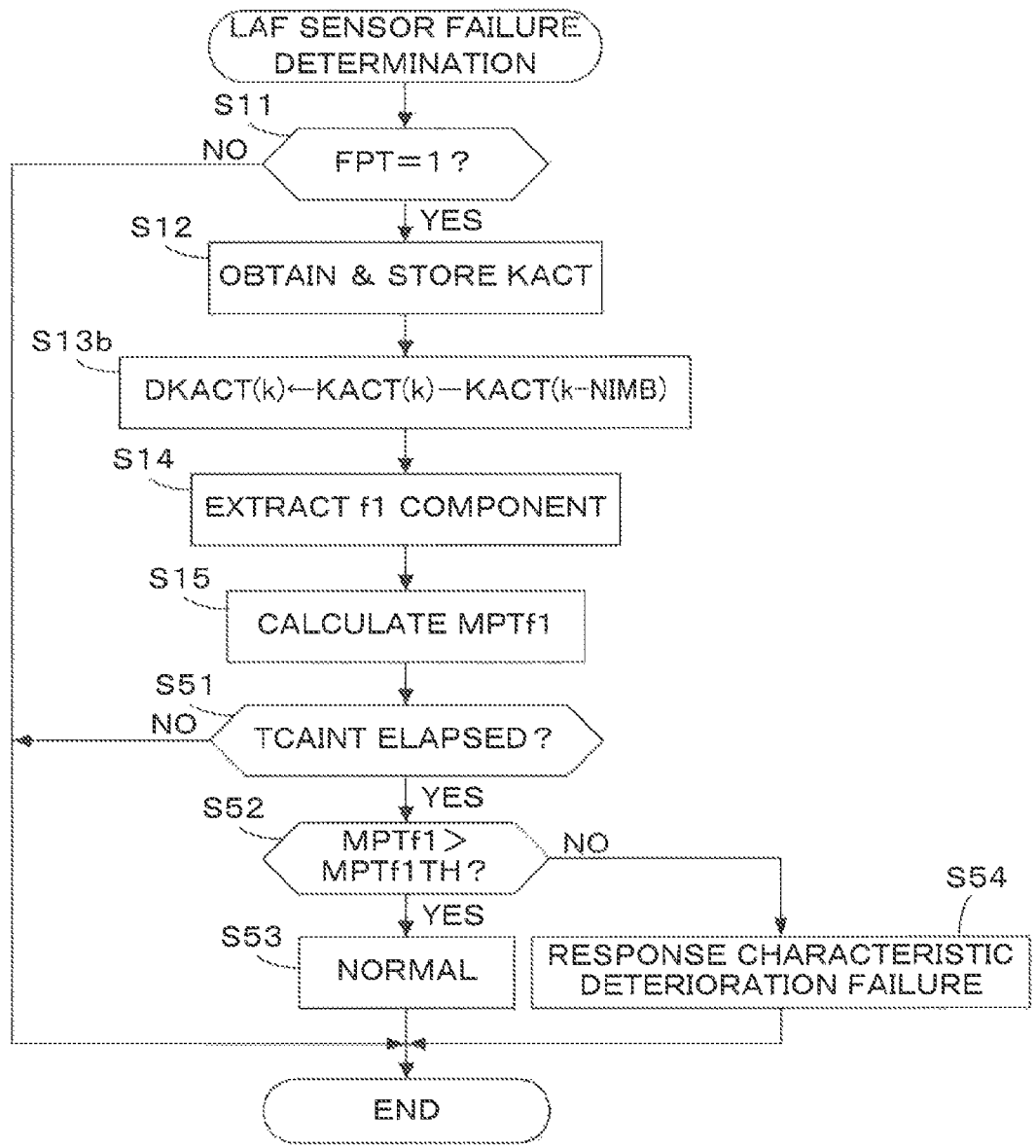
FIG. 8 is a flowchart of a process for performing a determination of the response characteristic deterioration failure of an oxygen concentration sensor (air-fuel ratio sensor) (fourth embodiment)

FIG. 8 is a flowchart of the response characteristic deterioration failure determination process in this embodiment. This process is executed by the CPU in the ECU 5 at intervals of a predetermined crank angle CACAL (for example, 30 degrees), when the execution condition of the response characteristic deterioration failure determination is satisfied.

The execution condition of the response characteristic deterioration failure determination is the same as that of the imbalance failure determination in the first embodiment.

If the determination execution condition is satisfied, the air-fuel ratio perturbation control is started to oscillate the target equivalent ratio KCMD with the following equation (4) (which is identical to the equation (4) indicated in the first embodiment).

$$KCMD=DAF \times \sin(Kf1 \times CACAL \times k)+1 \quad (4)$$

Steps S11, S12, S14, and S15 of FIG. 8 are the same as steps S11, S12, S14, and S15 of FIG. 4, and step S13b of FIG. 8 is obtained by replacing "DKACT1(k)" in step S13 of FIG. 4 with "DKACT(k)".

In step S51 of FIG. 8, it is determined whether or not a predetermined integration crank angle period TCAINT (for example, a period in which the crankshaft rotates 50 times) has elapsed from the time of starting calculation of the frequency component intensities. If the answer to step S51 is negative (NO), the process immediately ends. If the answer to step S51 is affirmative (YES), it is further determined whether or not the f1-frequency component intensity MTPf1 is greater than a failure determination threshold value MTPf1TH (step S52).

If the answer to step S52 is negative (NO), it is determined that the response characteristic deterioration failure of the LAF sensor 15 has occurred (step S19). On the other hand, if the answer to step S52 is affirmative (YES), it is determined that the response characteristic of the LAF sensor 15 is within the allowable range, i.e., the LAF sensor 14 is determined to be normal (step S53).

As described above, in this embodiment, the air-fuel ratio perturbation control is performed to oscillate the air-fuel ratio with the frequency f1, the difference DKACT(k) indicative of a difference between the present detected value KACT(k) and the past value KACT(k−NIMB) is calculated during execution of the air-fuel ratio perturbation control, and the f1-frequency component contained in the difference DKACT(k) is extracted with the band-pass filtering, wherein the past value KACT(K−NIMB) is a value detected at a timing of the discrete delay time period NIMB before and the discrete delay time period NIMB is set so as to reduce the 0.5th-order frequency component corresponding to the 0.5th-order frequency fIMB. The f1-frequency component intensity MPTf1 is calculated by integrating the absolute value of the band-pass filtering output. If the f1-frequency component intensity MPTf1 is equal to or less than the failure determination threshold value MPTf1TH, it is determined that the response characteristic deterioration failure of the LAF sensor 15 has occurred. Since the 0.5th-order frequency component contained in the difference DKACT(k) is greatly reduced, the f1-frequency component can be extracted with a sufficient S/N using a band-pass filtering whose pass-band width is comparatively wide. Consequently, the determination of the response characteristic failure of the LAF sensor 15 can be performed in a comparatively short time period with high accuracy.

Further in this embodiment, the frequency f1 with which the air-fuel ratio perturbation is performed is set to a frequency obtained by multiplying the engine rotational speed frequency fNE and "0.4", i.e., the frequency f1 increases as the engine rotational speed NE increases, which enables suppressing reduction in determination accuracy. In addition, the integration period for calculating the frequency component intensity is set with the crank angle period TCAINT. Accordingly, the actual integration time period corresponding to the crank angle period TCAINT becomes shorter as the engine rotational speed NE increases. Consequently, the execution time period of the air-fuel ratio perturbation control can be shortened, which enables suppressing deterioration in the exhaust characteristic.

If the oscillation frequency of the air-fuel ratio is set to a fixed value, the oscillation frequency may have a specific relationship with the engine rotational speed NE (e.g., the oscillation frequency may become equal to the engine rotational frequency fNE or half of the engine rotational frequency fNE), which makes it impossible to distinguish the air-fuel ratio change due to the air-fuel perturbation control from the air-fuel ratio change caused by the noises due to the engine rotation. In this embodiment, such problem can be avoided since the frequency f1 is set to the frequency of (0.4×NE). If, for example, a period of "20" oscillation cycles is required for completing the failure determination, the time period for the failure determination can be shortened as the engine rotational speed NE increases, which enables suppressing deterioration in the exhaust gas characteristic of the engine caused by performing the air-fuel ratio perturbation control.

In this embodiment, the LAF sensor 15 corresponds to the air-fuel ratio detecting means, the fuel injection valve 6 corresponds to a part of the air-fuel ratio oscillating means, the ECU 5 constitutes a part of the air-fuel ratio oscillating means, the difference signal generating means, the extracting means, and the failure determining means. Specifically, step S13 of FIG. 4 corresponds to the difference signal generating means, step S14 corresponds to the extracting means, and steps S15 and S52-S54 correspond to the failure determining means.

Modification

Figure 9:
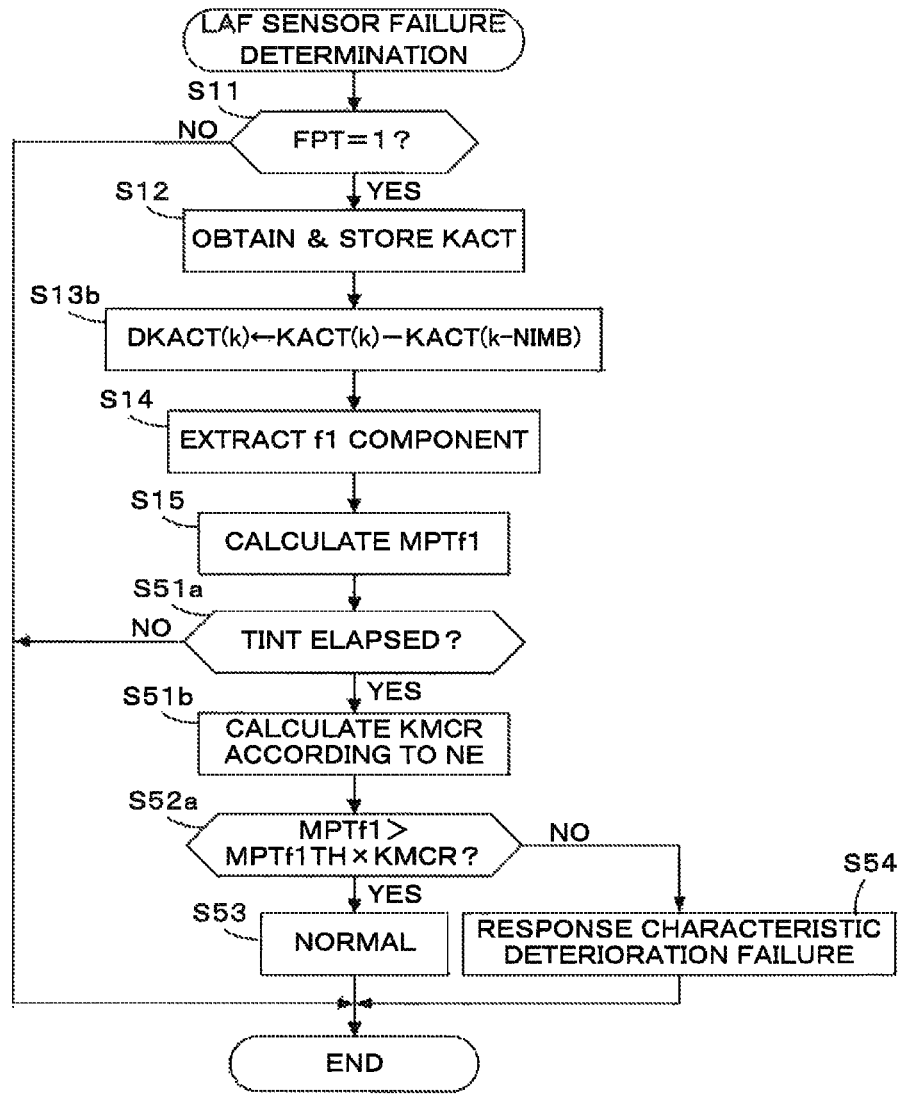
FIG. 9 is a flowchart of a modification of the process shown in FIG. 8.

The present invention is not limited to the embodiments described above, and various modifications may be made. For example, the process shown in FIG. 8 may be modified as shown in FIG. 9. The process of FIG. 9 is obtained by changing steps S51 and S52 respectively to steps S51a and S52a, and adding step S51b.

Figure 10:
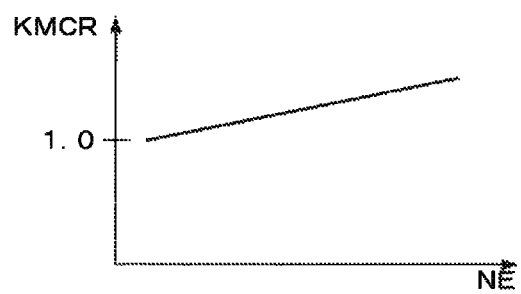
FIG. 10 shows a table referred to in the process of FIG. 9.
Figure 11A:
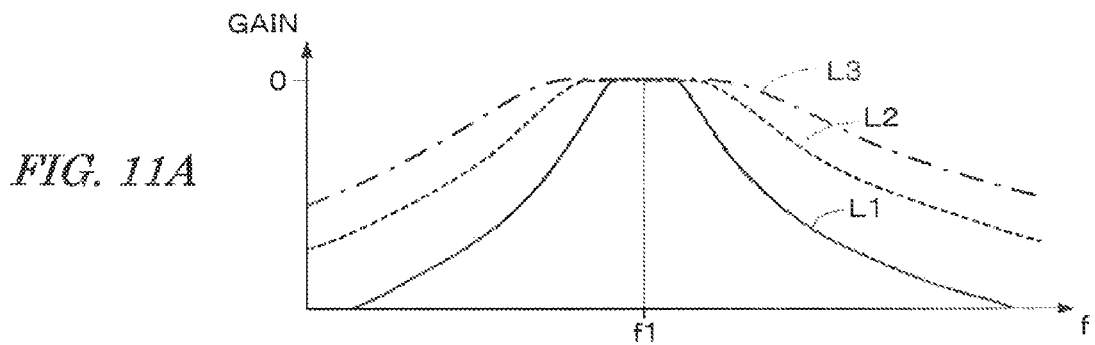
FIGS. 11A and 11B show graphs for illustrating a relationship between a pass-band width of a band-pass filtering and a transient response characteristic.
Figure 11B:
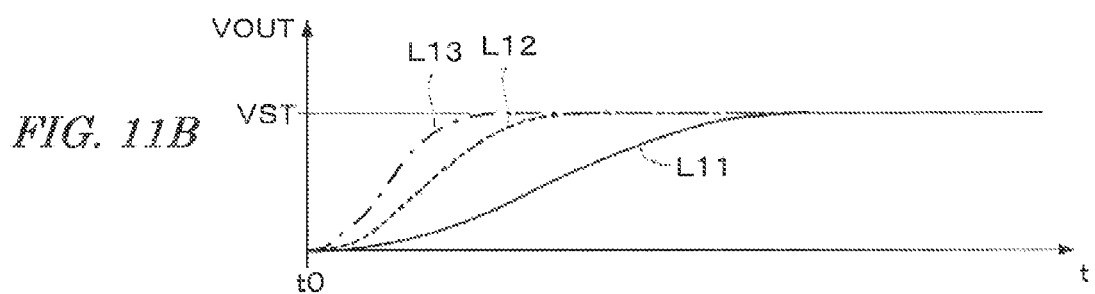
Figure 12A:
FIGS. 12A and 12B are time charts showing transient responses of a band pass filtering output.
Figure 12B:
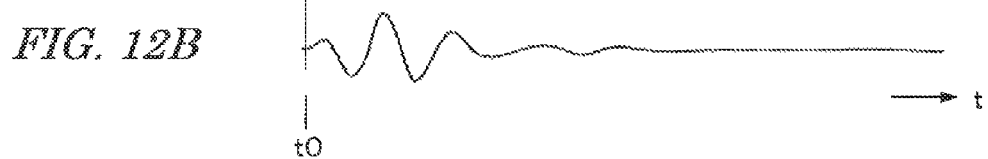

In step S51a, it is determined whether or not a predetermined integration period TINT (for example, a time period of about 2 seconds in which the air-fuel ratio oscillation of 20 cycles is performed at 1500 rpm of the engine rotational speed NE) has elapsed from the time of starting calculation of the frequency component intensity. If the answer to step S51a is negative (NO), the process immediately ends. If the answer to step S51a is affirmative (YES), a KMCR table shown in FIG. 10 is retrieved according to the engine rotational speed NE to calculate a correction coefficient KMCR. The KMCR table is set so that the correction coefficient KMCR increases as the engine rotational speed NE increases.

In step S52a, it is determined whether or not the f1-frequency component intensity MPTf1 is greater than a value obtained by multiplying the correction coefficient KMCR and the failure determination threshold value MTPf1TH. If the f1-frequency component intensity MPTf1 is equal to or less than the corrected failure determination threshold value (MTPf1TH×KMCR), it is determined that the response characteristic deterioration failure of the LAF sensor 15 has occurred (step S54). If the answer to step S52a is affirmative (YES), the LAF sensor 15 is determined to be normal (step S53).

In this modification, since the predetermined integration period TINT is set to a fixed time period, the number of integrating calculations increases as the engine rotational speed NE increases, which makes the calculated f1-frequency component intensity MPTf1 increase. Accordingly, using the corrected failure determination threshold value (MTPf1TH×KMCR) enables suppressing reduction in determination accuracy.

In step S52a, the f1-frequency component MPTf1TH may be divided by the correction coefficient KMCR instead of multiplying the failure determination threshold value MTPf1TH and the correction coefficient KMCR. With this modification, reduction in the determination accuracy can be suppressed, since the f1-frequency component MPTf1TH is corrected so as to decrease as the engine rotational speed NE increases.

In the fourth embodiment, the difference DKACT(k) is calculated using the past value KACT(k−NIMB) detected the discrete delay time period NIMB before, and the f1-frequency component contained in the difference DKACT(k) is extracted, wherein the discrete delay time period NIMB is set so as to reduce the 0.5th-order frequency component. Alternatively, if the detected equivalent ratio KACT contains another periodical noise component other than the 0.5th-order frequency component, the discrete delay time period may be set so as to reduce the another noise component.

Further, in the above-described embodiments, the first frequency f1 is set to a value obtained by multiplying the engine rotational speed frequency fNE and a constant value ("0.4"), i.e., the first frequency f1 is set to the frequency synchronized with the engine rotation. Alternatively, the first frequency f1 may be set to a fixed frequency, e.g., about 4 [Hz]. In this case, the allowable range of the engine rotational speed NE included in the execution condition of the failure determination is preferably limited to a comparatively narrow range.

Further, when setting the first frequency f1 to 4 [Hz], for example, the sampling period TPSP of the detected equivalent ratio KACT may be set to 12.5 [msec], the sampling period TPSP being applied to the process of reducing the f1-frequency component and the f2-frequency component. In this case, the failure determination process is performed at intervals of the sampling period TPSP, the second discrete delay time period Nf1 is set to "20", and the third discrete delay time period Nf2 is set to "10". The first discrete delay time period NIMB is set so as to be proportional to the reciprocal of the engine rotational speed NE, thereby reducing the 0.5th-order frequency component. Further, the filter coefficients of the band-pass filtering for extracting the 0.5th-order frequency component are set according to the engine rotational speed NE.

Alternatively, the fixed time interval data obtained by sampling the detected equivalent ratio KACT at intervals of a fixed time period, and the fixed crank angle interval data obtained by sampling the detected equivalent ratio KACT at intervals of a fixed crank angle period, may be stored in the memory. The band-pass filtering for extracting the f1-frequency component may be performed using the fixed time interval data, and the band-pass filtering for extracting the 0.5th-order frequency component may be performed using the fixed crank angle interval data.

Further, in the embodiment described above, the example in which the second frequency f2 is set to twice the first frequency f1. Alternatively, the second frequency f2 may be set to a value obtained by multiplying the first frequency f1 and an integer greater than "2", as shown in JP-'289 described above.

The calculation process of frequency component intensities (the band-pass filtering for extracting the object frequency component and the integrating calculation of the absolute value of the band-pass filtering output) may be performed at optimum intervals, independently from the failure determination process. In this case, the frequency component intensity calculation is not performed in the failure determination process, and the failure determination is performed by reading the frequency component intensities (the 0.5th-order frequency component intensity MIMB, the first frequency component intensity MPTf1, the second frequency component intensity MPTf2) which are calculated in the frequency component intensity calculation process executed in parallel.

Further, the present invention can also be applied to an air-fuel ratio control system for a watercraft propulsion engine such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An air-fuel ratio control system for an internal combustion engine having a plurality of cylinders, comprising:
   air-fuel ratio detecting means for detecting an air-fuel ratio in an exhaust passage of said engine;
   air-fuel ratio oscillating means for oscillating the air-fuel ratio with a first frequency;
   first difference signal generating means for generating a first difference signal indicative of a difference between a present value and a first past value detected by said air-fuel ratio detecting means during the operation of said air-fuel ratio oscillating means, wherein the first past value is a value detected at a timing of a first specific period before and the first specific period is set so as to reduce a specific frequency component corresponding to a specific frequency which is different from the first frequency;
   first extracting means for extracting a first frequency component corresponding to the first frequency, contained in the first difference signal;
   second difference signal generating means for generating a second difference signal indicative of a difference between a present value and a second past value detected by said air-fuel ratio detecting means during the operation of said air-fuel ratio oscillating means, wherein the second past value is a value detected at a timing of a second specific period before and the second specific period is set so as to reduce the first frequency component;
   second extracting means for extracting the specific frequency component contained in the second difference signal; and
   failure determining means for determining a failure of said air-fuel ratio control system based on a relationship between an intensity of the first frequency component extracted by said first extracting means, and an intensity of the specific frequency component extracted by said second extracting means.

2. The air-fuel ratio control system according to claim 1, wherein the specific frequency component is a 0.5th-order frequency component which is a component of a frequency which is half of the frequency corresponding to the engine rotational speed, and said failure determining means determines an imbalance failure based on the intensities of the first frequency component and the 0.5th-order frequency component, the imbalance failure being a failure that air-fuel ratios corresponding the plurality of cylinders of said engine differ with each other more greatly than an allowable limit.

3. The air-fuel ratio control system according to claim 1, wherein the specific frequency component is a second frequency component corresponding to a frequency obtained by multiplying the first frequency and an integer greater than "1", and said failure determining means determines a response characteristic deterioration failure of said air-fuel ratio detecting means based on the intensities of the first frequency component and the second frequency component.

4. The air-fuel ratio control system according to claim 2, wherein the first frequency is set so as to increase as the engine rotational speed increases, and the second specific period is set so as to decrease as the first frequency increases.

5. The air-fuel ratio control system according to claim 3, wherein the first frequency is set so as to increase as the engine rotational speed increases, and the second specific period is set so as to decrease as the first frequency increases.

6. An air-fuel ratio control system for an internal combustion engine having a plurality of cylinders, comprising:
air-fuel ratio detecting means for detecting an air-fuel ratio in an exhaust passage of said engine;
air-fuel ratio oscillating means for oscillating the air-fuel ratio with a first frequency;
first difference signal generating means for generating a first difference signal indicative of a difference between a present value and a past value detected by said air-fuel ratio detecting means during the operation of said air-fuel ratio oscillating means, wherein the past value is a value detected at a timing of a first specific period before and the first specific period is set so as to reduce a specific frequency component corresponding to a specific frequency which is different from the first frequency;
first second-order difference signal generating means for generating a first second-order difference signal indicative of a difference between a present value and a past value of the first difference signal, wherein the past value is a value of the first difference signal at a timing of a second specific period before and the second specific period is set so as to reduce a second frequency component corresponding to a frequency obtained by multiplying the first frequency and an integer greater than "1";
first extracting means for extracting a first frequency component corresponding to the first frequency, contained in the first second-order difference signal;
second difference signal generating means for generating a second difference signal indicative of a difference between a present value and a past value detected by said air-fuel ratio detecting means during the operation of said air-fuel ratio oscillating means, wherein the past value is a value detected at a timing of a third specific period before and the third specific period is set so as to reduce the first frequency component;
second second-order difference signal generating means for generating a second second-order difference signal indicative of a difference between a present value and a past value of the second difference signal, wherein the past value is a value of the second difference signal at a timing of the second specific period before;
second extracting means for extracting the specific frequency component contained in the second second-order difference signal;
third second-order difference signal generating means for generating a third second-order difference signal indicative of a difference between a present value and a past value of the first difference signal, wherein the past value is a value of the first difference signal at a timing of the third specific period before;
third extracting means for extracting the second frequency component contained in the third second-order difference signal;
first failure determining means for determining a response characteristic deterioration failure of said air-fuel ratio detecting means based on a relationship between an intensity of the first frequency component extracted by said first extracting means, and an intensity of the second frequency component extracted by said third extracting means; and
second failure determining means for determining an imbalance failure based on a relationship between the intensity of the first frequency component and an intensity of the specific frequency component extracted by said second extracting means, the imbalance failure being a failure that air-fuel ratios corresponding the plurality of cylinders of said engine differ with each other more greatly than an allowable limit.

7. The air-fuel ratio control system according to claim 6, wherein the first frequency is set so as to increase as the engine rotational speed increases, and the second and third specific periods are set so as to decrease as the first frequency increases.

8. An air-fuel ratio control system for an internal combustion engine having a plurality of cylinders, comprising:
air-fuel ratio detecting means for detecting an air-fuel ratio in an exhaust passage of said engine;
air-fuel-ratio oscillating means for oscillating the air-fuel ratio with a set frequency;
difference signal generating means for generating a difference signal indicative of a difference between a present value and a past value detected by said air-fuel ratio detecting means, wherein the past value is a value detected at a timing of a specific period before and the specific period is set so as to reduce a specific frequency component corresponding to a specific frequency which is different from the set frequency;
extracting means for extracting a set frequency component corresponding to the set frequency, contained in the difference signal; and
failure determining means for determining a response characteristic deterioration failure of said air-fuel ratio detecting means based on a relationship between a failure determination threshold value and an intensity of the set frequency component extracted by said extracting means.

9. The air-fuel ratio control system according to claim 8, wherein said failure determining means calculates the intensity of the set frequency component by integrating an amplitude of the set frequency component extracted by said extracting means over a set integration period, and the set frequency is set so as to increase as the engine rotational speed increases and one of the following steps 1) to 3) is performed:
1) reducing the set integration period as the engine rotational speed increases;
2) increasing the failure determination threshold value as the engine rotational speed increases; and
3) correcting the intensity of the set frequency component so as to decrease as the engine rotational speed increases.

* * * * *